United States Patent [19]

Nissen et al.

[11] 4,440,705

[45] Apr. 3, 1984

[54] PROCESS FOR THE PREPARATION OF CELLULAR AND NON-CELLULAR POLYURETHANE ELASTOMERS

[75] Inventors: Dietmar Nissen; Wolfgang Straehle, both of Heidelberg; Matthias Marx, Bad Durkheim, all of Fed. Rep. of Germany

[73] Assignee: BASF Aktiengesellschaft, Ludwigshafen, Fed. Rep. of Germany

[21] Appl. No.: 394,460

[22] Filed: Jul. 1, 1982

[30] Foreign Application Priority Data

Jul. 4, 1981 [DE] Fed. Rep. of Germany ....... 3126517

[51] Int. Cl.³ ...................... C08G 18/14; C08G 18/48
[52] U.S. Cl. ................................. 264/53; 264/328.18; 521/174; 521/914; 528/76
[58] Field of Search ................... 521/914, 174; 528/76

[56] References Cited

U.S. PATENT DOCUMENTS

| | | | |
|---|---|---|---|
| 3,887,505 | 6/1975 | Demou et al. | 521/914 |
| 4,243,760 | 1/1981 | McDaniel et al. | 521/176 |
| 4,272,618 | 6/1981 | Dominguez et al. | 521/160 |
| 4,273,884 | 6/1981 | Dominguez | 521/114 |
| 4,365,025 | 12/1982 | Murch et al. | 521/159 |

Primary Examiner—H. S. Cockeram
Attorney, Agent, or Firm—Norbert M. Lisicki

[57] ABSTRACT

A process for the preparation of optionally cellular and non-cellular polyurethane elastomers, preferably by reaction injection molding, organic polyisocyanates, polyether polyols based on polyoxyalkylene polyether polyols with terminal hydroxyethylene groups and an ethoxylation degree of 1 to 13, having a content of primary hydroxyl groups at the corresponding degree of ethoxylation as the value of curve A to 100 percent with curve A describing the dependency of the primary hydroxyl group content upon the degree of ethoxylation are reacted with chain extenders and/or cross-linking agents in the presence of catalysts as well as optionally blowing agents, auxiliaries and additives.

3 Claims, 1 Drawing Figure

DEGREE OF ETHOXYLATION =
MOLE NUMBER OF TERMINAL
HYDROXYETHYLENE UNITS
÷ FUNCTIONALITY

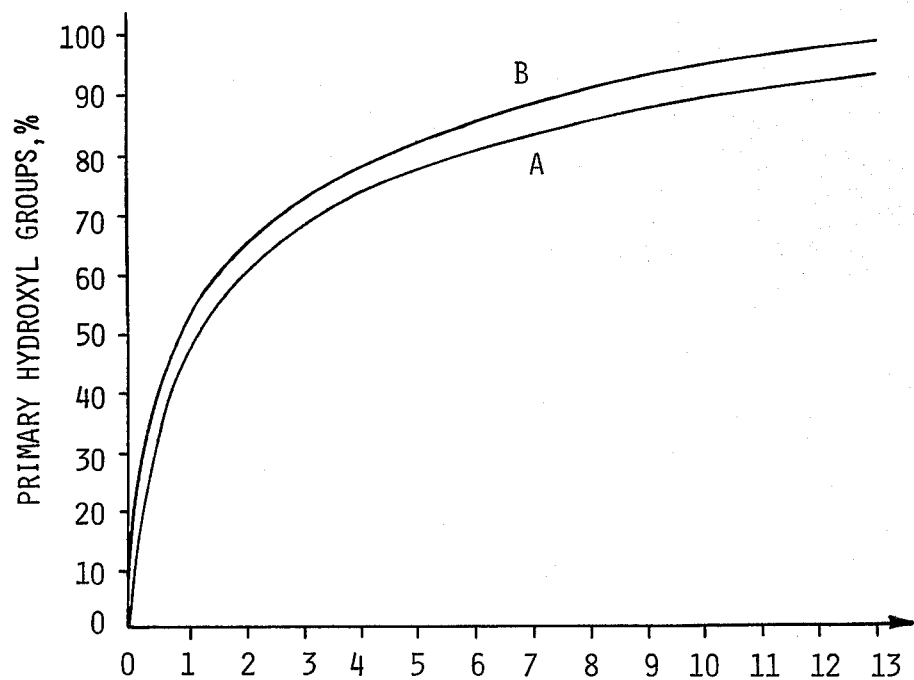

PROCESS FOR THE PREPARATION OF CELLULAR AND NON-CELLULAR POLYURETHANE ELASTOMERS

FIELD OF THE INVENTION

The present invention relates to the preparation of cellular and non-cellular polyurethane elastomers. More particularly the invention relates to the use of polyoxyalkylene polyether polyols containing an ethoxylation degree of 1 through 13 and a primary hydroxyl group content up to 100 percent for the preparation of polyurethane elastomers.

DESCRIPTION OF THE PRIOR ART

So-called activated high molecular block copolyether polyols with terminal hydroxyethylene groups which predominantly, that is up to a maximum of 85 percent, carry primary hydroxyl groups, are frequently used for the preparation of cellular polyurethane elastomers such as polyurethane flexible integral foams. Employing these products in accordance with appropriate formulations, consumer goods such as shoe soles, arm supports, steering wheel coatings, etc., with good mechanical properties can be produced. However, these known processes also have certain drawbacks. One drawback, for example, is the relatively long cycle time during the production of such consumer goods. Others are low tear strength and hardness. Improvement in these areas are particularly desirable for shoe sole materials.

These drawbacks are eliminated or at least reduced by this invention.

SUMMARY OF THE INVENTION

The object of this invention is thus a process for the preparation of optionally cellular polyurethane elastomers by reacting organic polyisocyanates, block polyether polyols, chain extenders and/or cross-linking agents in the presence of catalysts as well as optionally blowing agents, auxiliaries and additives wherein polyoxyalkylene polyether polyols with terminal hydroxyethylene groups are used as block polyether polyols having an ethoxylation degree of 1 through 13 and a primary hydroxyl group content with the corresponding degree of ethoxylation of the value of curve A up to 100 percent whereby curve A describes the dependency of the content of primary hydroxyl groups upon the degree of ethoxylation. Surprisingly, it was found that the demolding time and thus the cycle time required for the production of molded parts can be shortened in accordance with the process of this invention. The increase in the tear strength and the hardness must be particularly emphasized. Thus, it is possible to further adjust the tear strength of the shoe sole materials of polyurethane elastomers based on polyoxyalkylene polyether polyols to be used in accordance with this invention to approach the values for polyester-polyurethanes. Furthermore, the hardness of the products could be increased without increasing the concentration of rigid segments in the polyurethane elastomers, that is, without increasing the portion of polyisocyanate and chain extenders in the polyurethane formulation.

BRIEF DESCRIPTION OF THE DRAWING

Curve A in the FIGURE is a plot of the degree of ethoxylation versus the content of primary hydroxyl groups.

Curve B in the FIGURE is a plot of the degree of ethoxylation versus the content of primary hydroxyl groups.

DESCRIPTION OF THE PREFERRED EMBODIMENTS

A significant characteristic of this invention is the use of highly activated polyoxyalkylene polyether polyols with terminal hydroxyethylene groups as block polyether polyols for the preparation of polyurethane elastomers. Suited for this purpose are polyoxyalkylene polyether polyols with ethoxylation degrees of 1 to 13, preferably 2 to 8, and a content of primary hydroxyl groups with the corresponding ethoxylation degree of the value of curve A, preferably of the value of curve B in accordance with the illustration up to 100 percent whereby curves A and B describe the dependency of the content of primary hydroxyl groups upon the degree of ethyoxylation. The degree of ethoxylation in this case is defined as the quotient of the mole number of terminal hydroxyethylene units and the functionality of the polyoxyalkylene polyether polyols. In detail, the polyoxyalkylene polyether polyols to be used in accordance with this invention have the following content of primary hydroxyl groups as a function of the degree of ethoxylation:

TABLE 1

| Degree of Ethoxylation | Content of Primary Hydroxyl Groups (%) | |
| --- | --- | --- |
| | A | B* |
| 1 | 46.8–100 | 52–100 |
| 1.5 | 54.3–100 | 59.5–100 |
| 2 | 59.7–100 | 65.0–100 |
| 2.5 | 63.9–100 | 69.0–100 |
| 3 | 67.3–100 | 72.5–100 |
| 3.5 | 70.2–100 | 75.5–100 |
| 4 | 72.7–100 | 78–100 |
| 4.5 | 74.9–100 | 80–100 |
| 5 | 76.8–100 | 82–100 |
| 5.5 | 78.8–100 | 84–100 |
| 6 | 80.2–100 | 85.5–100 |
| 7 | 83.1–100 | 88.2–100 |
| 8 | 85.6–100 | 90.7–100 |
| 9 | 87.8–100 | 93–100 |
| 10 | 89.8–100 | 95–100 |
| 11 | 91.0–100 | 96–100 |
| 12 | 92.0–100 | 97–100 |
| 13 | 93.0–100 | 98–100 |

*B is the preferred range.

The limit values of A and B listed in Table 1 are located on curves A and B.

The polyoxyalkylene polyether polyols to be used in accordance with this invention are produced in several stages as described in German Patent Application No. P 30 30 737.0.

In the first stage, an alkylene oxide or mixtures of alkylene oxides are polymerized in the presence of, at the beginning of the reaction, 0.01 to 0.25 moles, preferably 0.10 to 0.25 moles of an alkaline catalyst per equivalent Zerewitinoff active hydrogen atom of the initiator molecule. With progressing polymerization and resultant increase of the molecular weight of the polymers, the miscibility of the alkylene oxides with the reaction medium improves. In this second reaction stage which begins after approximately 20 percent of the alkylene oxides has been added, the amount of catalyst may be increased incrementally or in one step so that 0.10 to 1.0 moles, preferably 0.12 to 0.3 moles, of an alkaline catalyst are present in the reaction mixture per equivalent Zerewitinoff active hydrogen atom of the initiator molecule. For a hydroxyl number range of equal to or greater than 25, it has proven to be advantageous to use 0.1 to 1.0 mole of an alkaline catalyst per equivalent Zerewitinoff active hydrogen atom of the initiator molecule and 0.12 to 1.0 mole of basic catalyst per equivalent Zerewitinoff active hydrogen atom of the initiator molecule for the hydroxyl number range below 25. If the catalyst amount is increased in stages, the polymerization is continued after each catalyst addition until a 100 percent reaction has been achieved. However, it is also possible to polymerize to a 100 percent completion of the reaction and then to increase the amount of catalyst in one step.

If an increase in the primary hydroxyl groups by less than approximately 12 percent is desired, it has proven to be advantageous to not increase the catalyst concentration with progressing polymerization but to add 0.10 to 0.25 moles, particularly 0.12 to 0.18 moles of an alkaline catalyst, per equivalent Zerewitinoff active hydrogen atom of the initiator molecule at the beginning of the polymerization.

In a third stage, the resultant crude polyether polyol is further polymerized in the presence of the added amount of catalyst of 0.10 to 1.0 mole of alkaline catalyst per reactive hydrogen atom with a maximum of 30 percent by weight, preferably 5 to 20 percent by weight, and more preferably 10 to 18 percent by weight of ethylene oxide based on the weight of the crude polyether polyol. Depending upon the equivalent weight of the polyether polyol, for example, with an equivalent weight of 500, 8.8 to 30 percent by weight of ethylene oxide result in ethoxylation degrees of 1 to 3.5. With an equivalent weight of 1000, 4.4 to 30 percent by weight of ethylene oxide result in an ethoxylation degree of 1 to 6.8 and with an equivalent weight of 2000, 2.2 to 30 percent by weight of ethylene oxide result in an ethoxylation degree of 1 to 13.6.

More particularly, the polyoxyalkylene polyether polyols are advantageously produced as follows:

The hydroxyl group-containing initiator molecules are partially transformed into the corresponding alcoholates with 0.01 to 0.25 mole of at least one alkaline catalyst per equivalent hydroxyl group. If amino group-containing compounds are used, at least one mole of alkylene oxide is initially added to every equivalent reactive hydrogen without catalyst and the resultant addition product is used as initiator molecule. Following this process, water or low boiling alcohol which may have formed, depending upon the catalyst used, is removed by distillation under reduced pressure. At temperatures of 50° C. to 150° C., preferably 80° C. to 130° C., mixtures of alkylene oxides containing from 0 to 40 weight percent of ethylene oxide, preferably 0.5 to 20 weight percent of ethylene oxide based on the total weight of alkylene oxide in an inert gas atmosphere such as nitrogen are introduced into the reactor at the rate at which they react, for instance, in 40 to 30 hours, preferably 6 to 10 hours, under atmospheric pressure or optionally under increased pressure of 1.1 to 20 bars, preferably 1.1 to 7 bars.

After an approximately 20 percent conversion, the polymerization may be interrupted in order to increase the catalyst concentration. This requires an initial separation of the unreacted ethylene oxide containing-alkylene oxide mixture, preferably under reduced pressure. Water or low boiling alcohol formed after the addition of catalyst must be removed by distillation before the polymerization can be continued and since this process may be repeated several times, for example, 2 to 10 times when the amount of catalyst is increased stepwise it has proven to be economically advantageous to complete the polymerization, that is, to polymerize until a conversion of approximately 100 percent is achieved before the catalyst concentration is increased. Therefore, this mode of operation is used on a preferred basis.

In accordance with this process variation, the excess ethylene oxide containing alkylene oxide mixture is also removed by distillation after completion of the polymerization at temperatures of 100° C. to 150° C. under reduced pressure. The catalyst amount is increased in one step. The resultant crude polyether polyol is partially or completely transferred into the alcoholate and is further polymerized under the above-described reaction conditions with a maximum percent by weight of ethylene oxide based on the polyether polyol mixture.

After removing the excess ethylene oxide by distillation, the alkali-containing polyoxyalkylene polyether polyols produced in accordance with this invention are neutralized with inorganic acids such as sulfuric acid, hydrochloric acid or phosphoric acid, acid salts such as potassium hydrogen phosphate, organic acids such as citric acid, tartronic acid and others or by the use of ion exchangers and are purified in accordance with well known methods.

Suitable alkylene oxides are those with 2 to 4 carbon atoms in the alkylene chain and molecular weight of 44 to 120, preferably 44 to 72. These include, for example, 1,2- and 2,3-butylene oxide, and preferably, 1,2-propylene oxide. Other compounds include styrene oxide and cyclohexene oxide. The above-mentioned class of compounds also includes ethylene oxide which, however, is always referred to separately in the description. In order to produce crude polyether polyols which are usable for further polymerization, the alkylene oxide may be used individually, alternatingly in sequence, as mixtures, or as ethylene oxide containing mixtures.

Suitable initiator molecules are di- to octafunctional polyamines and polyols and, preferably, di- to trifunctional polyols. Detailed examples include:

Ammonium, hydrazine, aliphatic and aromatic optionally N-mono- and N,N'-dialkyl substituted diamines with 1 to 4 carbon atoms in the alkyl radical such as optionally mono- and dialkyl substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-toluenediamine and 4,4'-, 2,4'- and 2,2'-diaminodiphenylmethanes; alkanolamines such as ethanolamine, diethanolamine, N-methyl- and N-ethyl-ethanolamine, N-methyl- and N-ethyl-diethanolamine and triethanolamine and water. Preferably used are multifunctional, particularly di- and/or trifunctional alcohols such as ethylene glycol, 1,2- and 1,3-propylene glycol, trimethylene glycol, diethylene glycol, dipropylene glycol, 1,4-butanediol, 1,6-hexamethylene glycol, glycerine, trimethylolpropane, pentaerythrital, sorbitol and sucrose.

Commonly used catalysts are alkali alkoxides with 1 to 4 carbon atoms in the alkyl radical such as sodium methylate, sodium and potassium ethylate, potassium isopropylate and sodium butylate, earth alkali hydroxides such as calcium hydroxide and, preferably, alkali hydroxides such as lithium and particularly sodium and potassium hydroxide.

The polyoxyalkylene polyether polyols to be used in accordance with this invention are di- to octafunctional, preferably di- to tetrafunctional and have hydroxyl numbers of 10 to 500, preferably 10 to 112, and particularly 20 to 75. The products are extraordinarily reactive in the reaction with organic polyisocyanates and their urethane carbodiimide, isocyanurate or urea modified derivatives. Products with a low content of oxyethylene units further excel by an improved miscibility with aromatic polyisocyanates.

Suitable for the preparation of the cellular and noncellular polyurethane elastomers are the well known organic polyisocyanates such as aliphatic, cycloaliphatic, araliphatic and preferably aromatic multifunctional isocyanates.

These include: alkylene diisocyanates with 4 to 12 carbon atoms in the alkylene radical such as 1,12-dodecane diisocyanate, 1,4-tetramethylene diisocyanate and preferably 1,6-hexamethylene diisocyanate; cycloaliphatic diisocyanates such as 1,3- and 1,4-cyclohexane diisocyanate as well as any desired mixture of these isomers, 1-isocyanato-3,3,5-trimethyl-5-isocyanatomethyl-cyclohexane (isophorone-diisocyanate), 2,4- and 2,6-hexahydrotoluenediisocyanate as well as the corresponding isomer mixtures, 4,4'-, 2,2'- and 2,4'-dicyclohexylmethane diisocyanate as well as the corresponding isomer mixtures and preferably aromatic di- and polyisocyanates such as 4,4'-, 2,4'- and 2,2'-diphenylmethane diisocyanate and the corresponding isomer mixtures, 2,4- and 2,6-toluene diisocyanate and the corresponding isomer mixtures, 1,5-naphthalene diisocyanate, polyphenylene polymethylene polyisocyanates, 2,4,6-toluene triisocyanate and preferably mixtures of diisocyanates and polyphenylene polymethylene polyisocyanates (crude MDI). The above-mentioned di- and polyisocyanates may be used individually or as mixtures thereof.

Also frequently used are so-called modified multifunctional isocyanates, that is, products which are obtained by the chemical reaction of the above-mentioned di- and/or polyisocyanates. Examples of suitable modified organic di- and polyisocyanates include: carbodiimide group-containing polyisocyanates in accordance with German Patent 10 92 007, allophanate group-containing polyisocyanates such as are described in British Pat. No. 994,890, Belgium Patent No. 761,626 and Dutch published application 71 02 524, isocyanurate group-containing polyisocyanate as are described, for example, in German Patent Nos. 10 22 789, 12 22 067 and 10 27 394 as well as German published application Nos. 19 29 034 and 20 04 048, urethane group-containing polyisocyanates as are described, for example, in Belgium Patent No. 752,261 or U.S. Pat. No. 3,394,164, acrylated urea group-containing polyisocyanates, for example, in accordance with German Patent No. 12 30 778, biuret group-containing polyisocyanates such as are described in German Patent No. 11 01 394 and British Pat. No. 889,050; polyisocyanates prepared by telomerization reactions such as those in accordance with Belgium Patent No. 723,640, ester group-containing polyisocyanates as are described, for example, in British Pat. Nos. 965,474 and 1,072,956, U.S. Pat. No. 3,567,765 and German Patent No. 12 31 688.

However, preferably used are urethane group-containing polyisocyanates, for example, those with low molecular weight diols, triols or polypropylene glycols, modified 4,4'-diphenylmethane diisocyanate or toluene diisocyanate, carbodiimide group and/or isocyanurate ring containing polyisocyanates, for example, those based on diphenylmethane diisocyanate and/or toluene diisocyanate and particularly toluene diisocyanates, diphenylmethane diisocyanates, mixtures of diphenylmethane diisocyanates and polyphenylene polymethylene polyisocyanates (crude MDI) and mixtures of toluene diisocyanates and crude MDI.

Preferably used chain extenders are low molecular weight di- to tetra-functional compounds of the group of aliphatic and/or araliphatic diols and/or triols, the secondary aromatic diamines, the aromatic diamines, and the 3,3',5,5'-tetra-alkyl-substituted 4,4'-diamino-diphenylmethane.

Suitable diols and triols have molecular weights of less than 400, preferably 60 to 300. Examples of suitable compounds are aliphatic and/or araliphatic diols with 2 to 14, preferably 4 to 10 carbon atoms, such as ethylene glycol, 1,3-propanediol, 1,10-decanediol, diethylene glycol, dipropylene glycol, and preferably 1,4-butanediol, 1,6-hexanediol, and bis-(2-hydroxyethyl)-hydraquinone, triols such as glycerine and trimethylolpropane and low molecular weight hydroxyl group-containing polyoxyalkylene compounds based on ethylene and/or propylene oxide and the above-mentioned initiator molecules.

Examples of secondary aromatic diamines include: N,N'-dialkyl-substituted aromatic diamines which may optionally be substituted at the aromatic nucleus by alkyl radicals with 1 to 20, preferably 1 to 4 carbon atoms in the N-alkyl radical, such as N,N'-diethyl-, N,N'-di-secondary-pentyl-, N,N'-di-secondary-hexyl-, N,N'-di-secondary-decyl-, N,N'-dicyclohexyl-para- and/or meta-phenylenediamine, N,N'-dimethyl-, N,N'-diethyl-, N,N'-diisopropyl-, N,N'-di-secondary-butyl-, N,N'-dicyclohexyl-4,4"-diamino-diphenylmethane and N,N'-di-secondary-butyl-benzidine.

Suitable aromatic diamines advantageously include those which have at least one alkyl substituent in the ortho position to the amino group, which are liquid at room temperature, and are miscible with the polyol, particularly polyether polyol. Alkyl-substituted meta-phenylenediamine having the formula

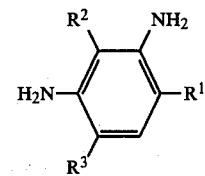

and/or

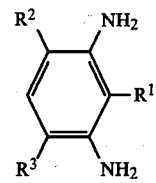

in which $R^3$ and $R^2$ are the same or different and are a methyl-, ethyl-, propyl- or isopropyl radical and in which $R^1$ denotes a branched alkyl radical with 4 to 10, preferably 4 to 6 carbon atoms also have proven to work well. Alkyl radicals $R^1$ in which the branching point is located at the $C^1$ carbon atom have proven to work particularly well. Examples for radicals $R^1$ include 1-methyloctyl-, 2-ethyloctyl-, 1-methylhexyl-, 1,1-dimethylpentyl-, 1,3,3-trimethylhexyl-, 1-ethylpentyl-, 2,ethylpentyl- and preferably cyclohexyl-, 1-methyl-n-propyl-, tertiary butyl-, 1-ethyl-n-propyl-, 1-methyl-n-butyl- and 1,1-dimethyl-n-propyl-radical.

Examples of alkyl-substituted meta-phenylenediamines include: 2,4-dimethyl-6-cyclohexyl-, 2-cyclohexyl-4,6-diethyl-, 2-cyclohexyl-2,6-isopropyl-, 2,4-dimethyl-6-(1-ethyl-n-propyl)-, 2,4-dimethyl-6-(1,1-dimethyl-n-propyl)-2-(1-methyl-n-butyl)-4,6-dimethyl-phenylenediamine-1,3. Preferably used are 2,4-dimethyl-6-tertiary butyl-, 2,4-dimethyl-6-isooctyl-, and 2,4-dimethyl-6-cyclohexyl-metaphenylenediamine-1,3.

Suitable 3,3',5,5'-tetra-n-alkyl-substituted 4,4'-diaminodiphenylmethanes include, for example, 3,3',5,5'-tetramethyl-, 3,3',5,5'-tetraethyl-, and 3,3',5,5-tetra-n-propyl-4,4'-diaminodiphenylmethane.

Preferably used are diaminodiphenylmethanes having the following formula

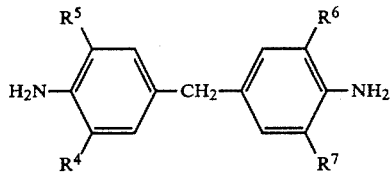

in which $R^4$, $R^5$, $R^6$ and $R^7$ are the same or different, and represent a methyl-, ethyl-, propyl-, isopropyl-, secondary butyl- or tertiary butyl radical with at least one of the radicals having to be an isopropyl or secondary butyl radical. The 4,4'-diaminodiphenylmethane may also be used as mixtures with isomers having formulas

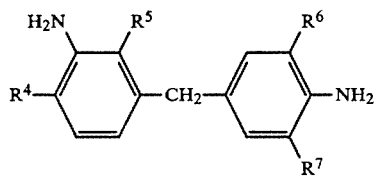

and/or

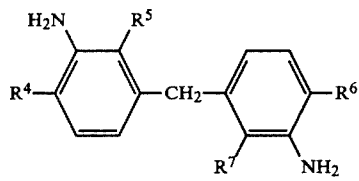

wherein $R^4$, $R^5$, $R^6$ and $R^7$ have the above-identified meaning.

Examples include: 3,3',5-trimethyl-5'-isopropyl-, 3,3',5-triethyl-5'-isopropyl-, 3,3',5-trimethyl-5'-secondary butyl-, 3,3',5-triethyl-5'-secondary butyl-4,4'-diaminodiphenylmethane, 3,3'-dimethyl-5,5'-diisopropyl-, 3,3'-diethyl-5,5'-diisopropyl-, 3,3'-dimethyl-5,5'-di-secondary butyl-, 3,3-'diethyl-5,5'-di-secondary butyl-, 3,5-dimethyl-3',5'-diisopropyl-, 3,5-diethyl-3',5'-diisopropyl-, 3,5'-dimethyl-3',5-di-secondary butyl-, 3,5-diethyl-3',5'-di-secondary butyl-4,4'-diaminodiphenylmethane, 3-methyl-3',5,5'-triisopropyl-, 3-ethyl-3',5,5'-triisopropyl-, 3-methyl-3',5,5'-tri-secondary butyl-, 3-ethyl-3',5,5'-tri-secondary butyl-4,4'-diaminodiphenylmethane, 3,3'-diisopropyl-5,5'-di-secondary butyl-, 3,5-diisopropyl-3',5'-di-secondary butyl-, 3-ethyl-5-secondary butyl-3',5'-diisopropyl-, 3-methyl-5-tertiary-butyl-3',5'-diisopropyl-, 3-ethyl-5-secondary butyl-3'-methyl-5'-tertiary-butyl-, 3,3',5,5'-tetraisopropyl- and 3,3',5,5'-tetra-secondary butyl-4,4'-diaminodiphenylmethane. Preferably used were 3,5-dimethyl-3',5'-diisopropyl- and 3,3',5,5'-tetraisopropyl-4,4'-diaminodiphenylmethane. The diaminodiphenylmethanes may be use individually or in the form of mixtures.

The mentioned chain extenders may be used individually or as mixtures thereof.

In accordance with the process of this invention, the chain extenders or their mixtures are used in amounts of 2 to 60 percent by weight, preferably 8 to 50 percent by weight, and particularly 10 to 40 percent by weight, based on the weight of the polyols and the chain extenders.

Used as catalysts are particularly compounds which greatly accelerate the reaction of the polyoxyalkylene polyether polyols and the optionally hydroxyl group-containing chain extenders with the polyisocyanates. Taken into consideration are organic metal compounds, preferably organic tin compounds such as tin-(II)-salts of organic carboxylic acids, for instance, tin-(II)-acetate, tin-(II)-octoate, tin-(II)-ethylhexoate and tin-(II)-laurate and the dialkyl tin-(IV)-salts of organic carboxylic acids such as dibutyl tin diacetate, dibutyl tin dilaurate, dibutyl tin maleate and dioctyl tin diacetate. The organic metal compounds are used alone or preferably in combination with strongly basic amines. Examples include amidines such as 2,3-dimethyl-3,4,5,6-tetrahydropyrimidine, tertiary amines such as triethylamine, tributylamine, dimethylbenzylamine, N-methyl-, N-ethyl-, N-cyclohexylmorpholine, N,N,N',N'-tetramethylethylenediamine, N,N,N',N'-tetramethylbutanediamine, pentamethyl-diethylenetriamine, tetramethyldiaminoethylether, bis(dimethylaminopropyl)urea, dimethylpiperazine, 1,2-dimethylimidazole, 1-azo-bicyclo(3,3,0)octane and preferably 1,4-diaza-bicyclo(2,2,2)octane and alkanol compounds such as triethanolamine, triisopropanolamine, N-methyl- and N-ethyl-diethanolamine and dimethylethanolamine.

Other suitable catalysts include: tris(dialkylaminoalkyl)-s-hexahydrotriazine, particularly tris(N,N-dimethylaminopropyl)-s-hexahydrotriazine, tetraalkylammonium hydroxides such as tetramethylammonium hydroxide, alkalihydroxides such as sodium hydroxide and alkali alcoholates such as sodium methylate and potassium isopropylate as well as alkali salts of long chained fatty acids with 10 to 20 carbon atoms and hydroxyl groups optionally in a side position. Preferably used are 0.001 to 5 percent by weight, particularly 0.05 to 2 percent by weight, of catalyst and/or catalyst combination based on the polyoxyalkylene polyether polyol weight.

The blowing agents which may also be used in the process of this invention include water which reacts with isocyanate groups to form carbon dioxide. The amounts of water which may be used advantageously are 0.05 to 2 percent by weight based on the weight of polyoxyalkylene polyether polyol.

Other applicable blowing agents are low boiling liquids which evaporate under the influence of the exothermal polyaddition reaction. Suited are liquids which are inert with the respect to the organic polyisocyanate and have boiling points below 100° C. Examples of such preferably used liquids are halogenated hydrocarbons such as methylene chloride, trichlorofluoromethane, dichlorodifluoromethane, dichloromonofluoromethane, dichlorotetrafluoroethane and 1,1,2-trichloro-1,2,2-trifluroethane.

Mixtures of these low boiling liquids with each other and/or with other substituted or unsubstituted hydrocarbons may also be used.

The most appropriate amount of low boiling liquid to be used for the preparation of cellular polyurethane elastomers is a function of the density to be achieved. Generally amounts of 0.5 to 15 parts by weight based on 100 parts by weight of polyoxyalkylene polyether polyol provide satisfactory results.

Optional auxiliaries and additives may also be incorporated in the reaction mixture. Examples include surfactants, foam stabilizers, cell regulators, fillers, dyes, pigments, flame retardants, hydrolysis protection agents, fungistats and bacteriostats.

Substances serving to support the homogenization of the starting materials, and which may optionally also be suited for regulating the cell structure, are used as surfactants. Examples include emulsifiers such as sodium salts of castor oil, sulphates, or of fatty acids, as well as salts of fatty acids with amines, for example, diethyl amine-oleate or diethanolamine-stearate, salts of sulfonic acid, for example, alkali or ammonium salts of dodecylbenzene or dinaphthylmethanedisulfonic acid and ricinoleic acid; from stabilizers such as siloxane-oxalkylene mixed polymers and other organo-polysiloxanes, ethoxylated alkyl phenols, ethoxylated fatty alcohols, paraffin oils, castor oil, and/or ricinoleic acid esters and Turkish red oil, and cell regulators such as paraffins, fatty alcohols and dimethylpolysiloxanes. The surface active substances are generally used in amounts of 0.01 to 5 parts by weight, based on 100 parts by weight of polyol.

Fillers, particularly reinforcing fillers, are understood to be the basically known organic and inorganic fillers, reinforcing agents, weighting agents, agents for improving the abrasion behavior in coatings, paints etc. Detailed examples include: inorganic fillers such as silicated minerals, for example, layered silicates such as antigorite, serpentine, horn blends, amphiboles, chrisotile, talcum; metal oxides such as kaolin, aluminum oxides, titanium oxides and iron oxides, metal salts such as lime, heavy spar and inorganic pigments such as cadmium sulphide, zinc sulphite, as well as glass, asbestos meal and others. Preferably used are kaolins (china clay), aluminum silicate, and cold precipitates, barium sulphate, and aluminum silicate as well as natural and synthetic fibrous minerals such as asbestos, wollastonite, and paticularly, glass fibers of various lengths which may be optionally sized. Examples for suitable organic fillers include: carbon, melamine, colophony, cyclopentadienyl resins, and preferably graft polymers based on styrene-acrylonitrile which were obtained by in situ polymerization of acrylonitrile-styrene mixtures in polyether polyols in accordance with the data in German Patent Nos. 11 11 394, 12 22 669 (U.S. Pat. Nos. 3,304,273, 3,838,351, 3,523,093 and 3,823,301) 11 52 536 (British Pat. No. 1,040,452) and 11 52 537 (British Pat. No. 987,618) as well as filler polyols where aqueous polymer dispersions are transformed into polyol dispersions.

The inorganic and organic fillers may be used individually or as mixtures. Preferably used are stable-filler polyol dispersions where the fillers in the presence of polyols undergo size reduction processes to particle sizes of less than 7 microns, in situ and with high local energy densities and are simultaneously dispersed. Filler-polyol dispersions of this type are described, for example, in German Published Applications Nos. 28 50 609, 28 50 610 and 29 32 304.

The inorganic and organic fillers are advantageously added to the reaction mixture in amounts of 0.5 to 50 percent by weight, preferably 1 to 40 percent by weight, based on the weight of polyisocyanate-polyol mixture.

Suitable flame retardants include, for example, tricresylphosphate, tris-2-chloroethylphosphate, tris-chloropropylphosphate, and tris-2,3-dibromopropylphosphate.

In addition to the already mentioned halogen substituted phosphates, inorganic flame retardants such as aluminum oxide hydrate, antimony trioxide, arsenic oxide, ammonium polyphosphate and calcium sulphate, as well as esterification products of low molecular polyols and halogenated phthalic acid derivatives, may be used to render the molded parts flame resistant. Generally it has been found to be advantageous to use 5 to 50 parts by weight, preferably 5 to 25 parts by weight, of the above-mentioned flame retardants per 100 parts by weight of polyol.

Detailed data on the above-mentioned, other commonly used auxiliaries and additives are contained in the appropriate literature, for instance, the monograph by J. H. Saunders and K. C. Frisch, "High Polymers," Vol. XVI, Polyurethanes, Parts 1 and 2, Interscience Publishers, 1962 and 1964.

For the preparation of polyurethane elastomers, the organic polyisocyanates, polyoxyalkylene polyether polyols and chain extenders are reacted in such amounts that the ratio of NCO groups to Zerewitinoff active hydrogen atoms bonded to OH—, and NH$_2$ and —NHR groups is 1:0.9 to 1:1.25, preferably 1:0.95 to 1:1.15.

The cellular, and preferably noncellular compact polyurethane elastomer molded parts are preferably prepared by the one-shot method according to the known reaction injection molding technique. This mode of operation is described, for example, by Piechota and Roehr in "Integral Foams," Carl-Hanser Publishers, Munich, Vienna, 1975; D. J. Prepelka and J. L. Wharton in the *Journal of Cellular Plastics,* March/April 1975, pages 87–98; and U. Knipp in the *Journal of Cellular Plastics,* March/April 1973, pages 76–84. However, the formulations may also be processed by conventional methods into cast elastomers and integral foams.

By using a mixing chamber with several feed nozzles, the initial components may be introduced individually and may be mixed intensively in the mixing chamber. It has proven to be particularly advantageous to work in accordance with the two-component process and to dissolve the chain extenders in the polyols, and combine this solution with a catalyst, and optionally with blowing agents, auxiliaries and additives in component A, and to use the organic polyisocyanates as component B. An advantage of this mode of proceeding is that components A and B can be stored separately and may be transported in a space-saving manner and only require mixing in the appropriate amount in order to be processed.

The amount of the reaction mixture introduced into the form is metered in such a manner that the resultant microcellular and/or noncellular molded parts have a density of 0.8 to 1.4 grams/cubic centimeter, preferably 0.9 to 1.35 grams/cubic centimeter, and that the cellular molded parts have a density of 0.1 to 0.8 grams per cubic centimeter, preferably 0.15 to 0.6 grams/cubic centimeter. The starting components are introduced into the mold at a temperature of 15° C. to 70° C., preferably 20° C. to 55° C. The mold temperature is advantageously 20° C. to 90° C., preferably 40° C. to 85° C. It may also be advantageous to use commonly applied mold release agents, for example, those based on wax or silicone, in order to improve the unmolding. The degrees of compression vary from 1.1 to 8.

The non-cellular polyurethane elastomers produced in accordance with the process of this invention are particularly well suited for use in the automobile industry, for instance, as shock absorber seals and body parts such as fenders, spoilers, wheel well expansions as well as housing parts and rollers. The cellular foams are used, for example, as shoe soles, arm supports, head supports, safety coverings inside the automobile, as well as motorcycle and bicycle seats and seat cushions and cover layers in composite foams. The parts referred to in the examples are parts by weight.

GENERAL PROCEDURE

Preparation of the polyoxyalkylene polyether polyols A to E to be used in accordance with this invention and Comparison Examples I through III.

The hydroxyl group-containing polyoxyalkylene polyether polyols were produced in accordance with a four-stage method. Depending upon the technical conditions, however, the oxyalkylation can optionally be subdivided into even more reaction stages. In the described process variation, the propylene oxide was polymerized with approximately 0.06 moles of potassium hydroxide per equivalent reactive hydrogen atom of the initiator molecule at the beginning of the reaction (except for polyol B and comparison substance III). After 100 percent reaction, the catalyst concentration was increased in one step with varying amounts of catalysts and was further polymerized with ethylene oxide.

First Stage

The initiator molecule was placed in the reactor and was mixed with a 45 percent by weight aqueous potassium hydroxide solution. In order to form the alcoholate, the mixture was heated to 130° C. for 1.5 hours under reduced pressure and water removed by distillation.

Second Stage

The propylene oxide was introduced at a temperature of 105° C. in such amounts that a pressure of 7 bars maximum was not exceeded. After completing the addition of propylene oxide and a post reaction of 4 to 5 hours, the reaction mixture was stripped in order to remove the residual monomers.

Third Stage

The reaction mixture was mixed with additional catalyst and, in order to separate the reaction water formed while the alcoholate is produced, was heated to 120° C. under reduced pressure until no additional water was stripped.

Fourth Stage

Analogous with the second stage, the ethylene oxide was added at 105° C. and under a maximum pressure of 5 bars. After reaction of the ethylene oxide, the reaction mixture was stripped under reduced pressure in order to remove the residual monomers and was processed in accordance with known methods.

The starting components and their amounts as well as the characteristic data of the resultant hydroxyl group-containing polyoxyalkylene polyether polyols are summarized in Table I.

The chemical structure of the products, the degree of ethoxylation, the hydroxyl number and the content of primary hydroxyl groups are summarized in Table 3. The percentages in parentheses are based on the weight of the alkylene oxide mixture.

TABLE 2

| | | | Examples A | C | D | E | B |
|---|---|---|---|---|---|---|---|
| | | | Comparison Examples I | II | | III | |
| First Stage: | Starter: Glycerine | (g) | — | — | — | 92.09 | 92.09 | 92.09 | — | — |
| | Propylene glycol | (g) | 76.09 | 76.09 | 76.09 | — | — | — | 76.09 | 76.09 |
| | 45% aqueous KOH | (g) | 19.6 | 19.6 | 19.6 | 33.5 | 30.0 | 33.3 | 9.5 | 9.5 |
| KOH/reactive hydrogen atoms | | (mole) | — | — | — | — | — | — | 0.038 | 0.038 |
| Second Stage: | Propylene oxide | (g) | 3560 | 3620 | 4221 | 6030 | 5360 | 6530 | 1690 | 1690 |
| | maximum pressure | (bars) | 6.2 | 6.0 | 6.5 | 6.5 | 6.0 | 6.7 | 5.5 | 5.4 |
| | Hydroxyl number | | 36.5 | 36.1 | 31.5 | 34 | 39.4 | 30 | 64 | 63 |
| Third Stage: | 45% by weight aqueous KOH | (g) | — | 50 | 50 | — | 74.8 | 74.8 | — | 63.3 |
| KOH/reactive hydrogen atoms | | (mole) | — | — | — | — | — | — | — | 0.25 |
| Fourth Stage: Ethylene oxide | | (g) | 790 | 900 | 575 | 1500 | 1340 | 890 | 371 | 370 |
| maximum pressure | | (bar) | 4.0 | 4.5 | 4.0 | 4.5 | 4.0 | 3.5 | 3.8 | 4.0 |
| Properties | | | | | | | | | | |
| Degree of ethoxylation* | | | 8.0 | 8.93 | 5.56 | 9.66 | 8.50 | 5.8 | 4.25 | 4.25 |
| Hydroxyl number | | | 29 | 28 | 27 | 26 | 30 | 26 | 52.5 | 52 |
| Primary hydroxyl groups | | (%) | 84 | >95 | 90 | 83 | 94 | 93 | 65 | 87 |
| Unsaturated components | | (% by wt.) | 0.065 | 0.063 | 0.07 | 0.07 | 0.09 | 0.064 | 0.02 | 0.02 |
| Acid number | | | >0.01 | >0.01 | >0.01 | >0.01 | >0.01 | >0.01 | >0.01 | >0.01 |
| Water content | | (% by wt.) | 0.03 | 0.01 | 0.02 | 0.02 | 0.04 | 0.04 | 0.03 | 0.02 |

*taking into consideration the unsaturated components

TABLE 3

Chemical structure of the polyoxyalkylene-polyether polyols used in accordance with this invention

| | Chemical Structure | | Degree of Ethoxylation* | Hydroxyl Number (mg KOH/g) | Primary Hydroxyl Groups (%) |
|---|---|---|---|---|---|
| Examples | | | | | |
| A | Dipropylene glycol-propylene oxide-ethylene oxide | (80%) (20%) | 8.93 | 28 | 95 |
| B | Dipropylene glycol-propylene oxide-ethylene oxide | (82%) (18%) | 4.25 | 52 | 87 |
| C | Dipropylene glycol-propylene oxide-ethylene oxide | (88%) (12%) | 5.56 | 27 | 90 |
| D | Glycerine-propylene oxide-ethylene oxide | (80%) (20%) | 8.5 | 30 | 94 |
| E | Glycerine-propylene oxide-ethylene oxide | (88%) (12%) | 5.8 | 26 | 93 |
| Comparison Examples: | | | | | |
| I | Propylene glycol-propylene oxide-ethylene oxide | (81.8%) (18.2%) | 8 | 29 | 84 |
| II | Glycerine-propylene oxide-ethylene oxide | (88%) (12%) | 9.66 | 26 | 83 |
| III | Propylene glycol-propylene oxide-ethylene oxide | (82%) (18%) | 4.25 | 52.5 | 65 |

*taking into consideration the unsaturated components

PREPARATION OF CELLULAR POLYURETHANE ELASTOMERS

Comparison Example

A mixture (polyol component) consisting of

| | |
|---|---|
| 68.1 | parts polyol I, |
| 16.8 | parts polyol II, |
| 0.5 | part ethylene glycol, |
| 7.3 | parts butanediol-1,4, |
| 1.6 | parts of a 25 percent solution of diazabicyclooctane in 1,4-butanediol |
| 0.1 | part of a 50 percent solution of water in sulfonated castor oil, |
| 0.016 | part dibutyl tin dilaurate, |
| 0.1 | part of a silicone oil (DC 193 by Dow Corning) and |
| 5.5 | parts dichlorodifluoromethane | were mixed with 47 parts of a reaction product of 4,4'-diphenylmethane diisocyanate and dipropylene glycol with an isocyanate content of 23 percent (isocyanate component A) using a low pressure metering device model EMB F 20 St (manufacturer: Elastogran Machine Construction).

240 Grams of the resultant mixture were introduced into a metal mold having dimensions of 200×200×10 mm which was heated to 50° C.

In order to determine the minimum demold time, a sample plate was removed from the metal form after 2.5 minutes and the so-called bending test was carried out. For this purpose the sample panel was quickly bent by 180° at intervals of 15 seconds and in each case at a different point and the point in time was determined at which no hairline cracks occurred at the bending point. This point in time is referred to as t-crackfree.

The other produced panels were demolded after the time t-crackfree and the mechanical properties were determined in accordance with RAL RG-702/1.

EXAMPLES F, G, H AND I

The procedure was the same as followed in Comparison Example 1 but polyols I and II were replaced by the polyoxyalkylene polyether polyols of Examples A to E in accordance with this invention. The other substances used for the polyol components were used in the quantities specified in the comparison example.

The type and quantities of the polyols used and the amount of isocyanate component A as well as the mechanical properties measured on the resultant panels are shown in Table 4.

It was found that significantly shorter demold times were achieved with the polyols according to this invention with equally good dimensional stability (no shrinkage, no swelling) and with equally good breaking elongation and long-term bending stability. A markedly improved tear strength was achieved with the polyol of Example B whereas a significant increase in the hardness was achieved with polyols of Examples A, C, D and E.

TABLE 4

Composition and mechanical properties of cellular polyurethane elastomers

| Starting Materials | | Comparison Example | Examples F | G | H | I |
|---|---|---|---|---|---|---|
| Polyol of Example I (parts) | | 68.1 | — | — | — | — |
| Polyol of Example II (parts) | | 16.8 | 17.0 | — | — | — |
| Polyol of Example A (parts) | | — | — | — | 67.9 | — |
| Polyol of Example B (parts) | | — | 67.9 | 84.95 | — | — |
| Polyol of Example C (parts) | | — | — | — | — | 67.9 |
| Polyol of Example D (parts) | | " | — | — | — | 17.0— |
| Polyol of Example E (parts) | | " | — | — | — | —17.0 |
| Isocyanate component A (parts) | | 47 | 52 | 53 | 47 | 46 |
| Mechanical Properties of the Test Panel | | | | | | |
| Bulk density | (g/cm$^3$) | 0.6 | 0.6 | 0.6 | 0.6 | 0.6 |
| t-crackfree | (min.) | 4.5 | 3.0 | 3.5 | 3.5 | 3.0 |
| Tear strength* | (N/mm$^2$) | 5.0 | 6.6 | 6.2 | 5.5 | 5.1 |
| Elongation at break* | (%) | 450 | 450 | 440 | 450 | 430 |
| Determination of permanent bending | | | no increase in length of cut | | | |

TABLE 4-continued

| | Composition and mechanical properties of cellular polyurethane elastomers | | | | |
|---|---|---|---|---|---|
| | | Comparison | Examples | | |
| Starting Materials | | Example | F | G | H | I |
| behavior 30,000 H with 2 mm cut* | | | | | | |
| Hardness | (Shore A) | 64 | 63 | 64 | 68 | 69 |

*determined in accordance with RAL RG-702/1 drawing

The embodiments of the invention in which an exclusive privilege or property is claimed are defined as follows:

1. A process for the preparation of cellular or non-cellular polyurethane elastomers by reacting organic polyisocyanates, polyether polyols, chain extenders and/or cross-linking agents in the presence of catalysts as well as blowing agents, auxiliaries and additives, wherein polyoxyalkylene polyether polyols with terminal hydroxyethylene groups are used as the polyether polyols said polyether polyols prepared by reacting initiator compounds having molecular weights of 18 to 342 and containing from 2 to 8 Zerewitinoff active hydrogen atoms in the presence of alkaline catalysts selected from the group consisting of alkali metal alkoxides, alkali metal hydroxides and alkaline earth metal hydroxides comprising (a) initially reacting alkylene oxides containing more than 2 carbon atoms in the presence of from 0.01 to 0.25 mole of said catalyst per equivalent of said initiator compound, (b) further reacting the alkylene oxides containing more than 2 carbon atoms in the presence of from 0.10 to 1.0 mole of said catalyst per equivalent of said initiator compound, (c) further reacting the alkylene oxide adduct of step (b) with ethylene oxide at a maximum concentration of 30 weight percent based on the weight of the crude polyether polyol, and (d) removing the alkaline catalyst.

2. The process of claim 1, wherein the polyoxyalkylene polyether polyols have ethoxylation degrees of 2 to 8.

3. The process of claim 1, wherein the components for the manufacture of the cellular and non-cellular polyurethane elastomers are prepared in accordance with the reaction molding technique.

* * * * *

UNITED STATES PATENT AND TRADEMARK OFFICE
CERTIFICATE OF CORRECTION

PATENT NO. : 4,440,705

DATED : April 3, 1984

INVENTOR(S) : Dietmar Nissen, Wolfgang Straehle and Matthias Marx

It is certified that error appears in the above-identified patent and that said Letters Patent is hereby corrected as shown below:

Column 16, Claim 3, line 3, change prepared to "reacted".

Signed and Sealed this

Tenth Day of July 1984

[SEAL]

Attest:

GERALD J. MOSSINGHOFF

Attesting Officer

Commissioner of Patents and Trademarks